(12) United States Patent
Koester

(10) Patent No.: US 8,014,093 B2
(45) Date of Patent: Sep. 6, 2011

(54) HARD DISK SECTOR/TRACK REMAPPING FOR TRANSPARENT WEAR LEVELING

(75) Inventor: William Charles Koester, Grosse Ile, MI (US)

(73) Assignee: Thomson Licensing, Boulogne-Billacourt (FR)

( * ) Notice: Subject to any disclaimer, the term of this patent is extended or adjusted under 35 U.S.C. 154(b) by 0 days.

(21) Appl. No.: 12/452,958

(22) PCT Filed: Jul. 28, 2008

(86) PCT No.: PCT/US2008/009116
§ 371 (c)(1),
(2), (4) Date: Jan. 28, 2010

(87) PCT Pub. No.: WO2009/025715
PCT Pub. Date: Feb. 26, 2009

(65) Prior Publication Data
US 2010/0134914 A1    Jun. 3, 2010

Related U.S. Application Data

(60) Provisional application No. 60/965,722, filed on Aug. 22, 2007.

(51) Int. Cl.
*G11B 27/36* (2006.01)
(52) U.S. Cl. ............................ 360/31; 360/60
(58) Field of Classification Search .................. None
See application file for complete search history.

(56) References Cited

U.S. PATENT DOCUMENTS

| 7,076,604 | B1 | 7/2006 | Thelin |
| 7,149,046 | B1 | 12/2006 | Coker et al. |
| 7,177,979 | B2 * | 2/2007 | Kuwamura ............. 711/112 |
| 7,567,400 | B2 * | 7/2009 | Cheng ..................... 360/60 |
| 2003/0227804 | A1 | 12/2003 | Lofgren et al. |
| 2006/0245102 | A1 | 11/2006 | Cheng |
| 2007/0019315 | A1 | 1/2007 | Tamura et al. |

FOREIGN PATENT DOCUMENTS

| EP | 1564736 A2 * | 8/2005 |
| JP | 63282907 A * | 11/1988 |

OTHER PUBLICATIONS

International Search Report, dated Dec. 12, 2008.

\* cited by examiner

*Primary Examiner* — Jason Olson
(74) *Attorney, Agent, or Firm* — Robert D. Shedd; Patricia A. Verlangieri

(57) ABSTRACT

The present principles provide methods for storing the write counts for each track on the track or alternatively in NVRAM in the hard disk. Most hard disks already have a mechanism to remap a sector that becomes un-writable. This mechanism is used to remap entire tracks when a track write count becomes too high. A track with an excessively high write count can be mapped by the hard disk firmware to a track with a very low write count. By automatically remapping these tracks based on the number of write the wear can be more evenly distributed across the platter thus increasing the service life of the hard disk without modification to the application software.

8 Claims, 2 Drawing Sheets

HARD DISK SECTOR/TRACK REMAPPING FOR TRANSPARENT WEAR LEVELING

CROSS REFERENCE TO RELATED APPLICATION

This application claims the benefit, under 35 U.S.C. §365 of International Application PCT/US2008/009116, filed Jul. 28, 2008 which was published in accordance with PCT Article 21(2) on Feb. 26, 2009 in English and which claims the benefit of U.S. provisional patent application No. 60/965,722 filed Aug. 22, 2007.

TECHNICAL FIELD

The present principles generally relate to data writing on storage devices, and more particularly to methods and systems for remapping for wear leveling in storage device file systems.

BACKGROUND

A common problem associated with data storage is corruption of portions of a file system on a storage medium. Some digital video recording software utilizes fixed tracks to provide a "pause buffer" that can be used to pause or rewind live television. Other software will allow the file system to decide where to store the recording on the hard disk. The disadvantage of this approach is that certain hard disk tracks will receive most of the writes causing those tracks to wear at a higher rate than the rest of the disk.

Another concern associated with data storage and reading includes efficiency. For example, it is often desirable to utilize the least amount of resources as possible when writing and reading data to and from a storage device. To address these concerns, a cache system comprising a relatively small portion of a storage medium is typically employed. Due to the size of a cache, reading data from a cache is often much quicker than reading data from the main platter of a storage medium. In many cache systems, data is written to the cache prior to writing data to the main platter of a storage medium. In addition, writing data to the platter may also occur in an order that is different from the order of the original commands implementing the writes. Cache systems commonly write data to the platter in such a way as to minimize scanning of a storage medium during writing operations. The order of writes on a platter in a cache system tends to be more dependent on the write locations on the storage medium rather than the order in which write commands are issued.

Accordingly, there is a need for a data storage system to provide efficient writing of data.

SUMMARY

The present invention is directed to storing the write counts for each track on the track or alternatively in NVRAM in the hard disk. Most hard disks already have a mechanism to remap a sector that becomes un-writable. This mechanism is used to remap entire tracks when a track write count becomes too high. A track with an excessively high write count can be mapped by the hard disk firmware to a track with a very low write count. By automatically remapping these tracks based on the number of write the wear can be more evenly distributed across the platter thus increasing the service life of the hard disk without modification to the application software.

The invention may be advantageously used in a video recording environment, for example in a PVR, which requires accurate and timely recording of compressed digital video content.

BRIEF DESCRIPTION OF THE DRAWINGS

The teachings of the present principles can be readily understood by considering the following detailed description in conjunction with the accompanying drawings, in which.

Figure 1:
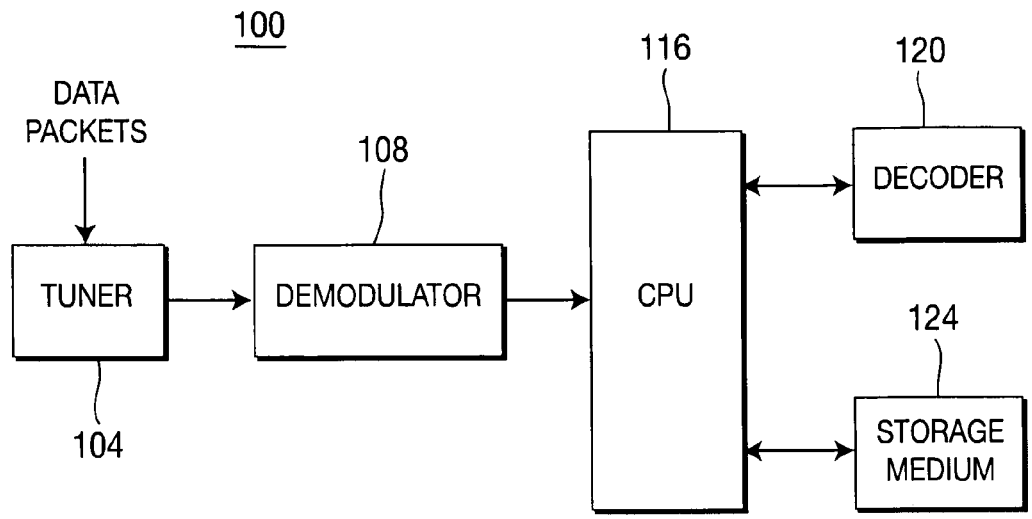
FIG. 1 is a block diagram of an exemplary implementation of a personal video recorder in accordance with aspects of the present principles.

It should be understood that the drawings are for purposes of illustrating the concepts of the present principles and are not necessarily the only possible configuration for illustrating the present principles. To facilitate understanding, identical reference numerals have been used, where possible, to designate identical elements that are common to the figures.

DETAILED DESCRIPTION

The present invention is directed to storing the write counts for each track on the track or alternatively in NVRAM in the hard disk. Most hard disks already have a mechanism to remap a sector that becomes un-writable. This mechanism is used to remap entire tracks when a track write count becomes too high. A track with an excessively high write count can be mapped by the hard disk firmware to a track with a very low write count. By automatically remapping these tracks based on the number of write the wear can be more evenly distributed across the platter thus increasing the service life of the hard disk without modification to the application software.

Some DVR applications dedicate specific tracks for the pause buffer. As a result the number of writes to the sectors on these tracks can be much greater than the number of write cycles on other tracks. The magnetic material on these tracks can wear out at a greater rate than that of the rest of the tracks artificially reducing the overall lifespan of the drive.

It may be possible to track the number of writes to each sector/track and remap sectors at the HD controller level to address this problem and spread the writes evenly over the drive. This operation would have to be transparent to the application and take into account fragmentation and seek times without significantly impacting performance. Whole track remapping rather than individual sector remapping may help to address the fragmentation and performance issues with this type of approach.

In many DVR applications it is not possible or desirable to implement algorithms at the application or OS level to deal with these issues. HD manufactures are encouraged to develop alternate methods to overcome these problems strictly at the HD level.

During an uncontrolled power loss, the typical disk drive will automatically park the disk heads in a safe zone. The automatic parking uses rotational energy to power the disk head movement after power loss, but sometimes at the cost of stress and strain on the disk drive. Some disk drive manufacturers consider the abrupt power down as a stressor on the disk drive that might have some negative impact on disk drive reliability and life. Normally, the disk drive should be given a command to shut down before power loss in order to maximize disk drive life expectancy.

DVR applications never perform a proper OS level shutdown. The usual method for powering down a DVR is for the user to unplug it or a power outage. Neither of these scenarios allows for proper shutdown with flushing of the HD cache and controlled head parking. In some models this design drawback can be partially overcome with early power fail routines (EPF).

EPF routines usually have limited time to work with, on the order of 10-40 ms typically. If an attempt is made to park the heads under control with the STANDBY_IMMEDIATE or similar function, current HD models will attempt to flush the cache first which will often take longer than the allotted time and almost guarantee the drive is writing when power goes away. This will usually result in worse behavior than doing nothing at all since the result will usually be a write-splice error, lost data and an uncontrolled head park.

In DVR applications, loss of data is expected and accounted for. What is needed from the HD manufacturers is a special shutdown command that completes the current sector write (if writing), discards any additional data in the cache and then performs a controlled head park. In most cases a loss of data is preferred over a write-splice error.

Referring now in specific detail to the drawings in which like reference numerals identify similar or identical elements throughout the several views, and initially to FIG. 1, an illustrative example of a PVR 100 implementing aspects of the present principles is depicted. The PVR 100 may include a processor 116 and a storage medium 124. The storage medium 124 may be, but is not limited to, a hard disk drive and may be utilized to store both the journal data and the data to be written in accordance with write data commands. However, as described above, in other implementations, the journaled data may be stored in a storage mechanism completely separate from the storage medium in which the data is written in accordance with write commands. The central processing unit 116 may comprise, for example a BCM 7038 C2 chip, commercially available from Broadcom®, which is a dual channel HD video/audio/graphics and personal video recording chip that incorporates a 300 MHz 64-bit CPU. The BCM 7038 C2 is a common processor employed in personal video recorders.

In one implementation of the present principles, audio/video data packets in MPEG-4 compression format received via satellite technology circuitry may be transmitted to the CPU 116 through stream 112. For example, a tuner 104 may tune to the appropriate frequency and receive the data packets. In addition, a demodulator 108 may synchronously demodulate an output signal from the tuner and provide audio/video data packets to the CPU 116 through stream 112. Thereafter, the audio/video data may be decompressed by utilizing decoder 120, which may comprise a BCM 7411 CO decoder, also commercially available from Broadcom®. The BCM 7411 CO decoder is compatible with MPEG-4 video streams. However, it should be understood that the audio/video data may be in any format known in the art, such as, for example, MPEG-2, and may be received by other means, such as, for example, via cable television transmission. Upon receipt of audio/visual data in an audio/video data stream, the CPU 116 may be configured via suitable software and hardware to implement the method steps described below.

Aspects of some PVRs that differ from some standard computing devices, such as personal computers, for example, include a fixed time constraint for reading and writing audio/video data. If such a PVR system, or any other system operating under a fixed time constraint, does not complete a transaction within the fixed time interval, the PVR moves onto the next part of the presentation and the information associated with an incomplete transaction may be either lost or discarded. The constraint is due to the desirability to timely display as much of a presentation as possible. Thus, when audio or video data arrives too late, it is discarded to prevent the PVR record-play system from breaking down. Accordingly, quick reading of data provided by a cache is desirable in a system operating under a fixed time constraint, such as a PVR, to prevent the loss of information.

Another aspect of some PVRs that differs from some standard computing devices is that the PVRs typically do not perform a proper operating system shutdown sequence, as the PVRs are normally powered down upon removal of an electric plug from an outlet by a user or upon a power outage. In standard computing devices, hard disk drives are commonly given a command to shut down to permit sufficient time to flush data from the cache to the platter and to permit read/write heads to park in a safe zone, each of which prevent data corruption and data loss. Various PVR designs have addressed the sudden power loss problem by instituting early power fail (EPF) routines. An EPF routine utilizes electrical current remaining in the PVR system subsequent to power supply loss, which may continue to run the PVR for approximately 10-40 ms. Using the remaining current, some EPF routines attempt to flush the cache and perform a controlled head park. Generally, such EPF routines often fail to complete the cache flush prior to dissipation of the remaining current. Thus, these EPF routines typically instruct PVR drives to write data onto the main platter as the power dissipates, thereby resulting in write-splice errors, data loss and uncontrolled head parking.

In accordance with one aspect of the present principles, a special shutdown command sequence is incorporated into an EPF routine that completes the current sector write (if the system is writing), discards any additional data in the cache, and then performs a controlled head park. Data loss is often preferred over write-splice errors. As described above, write-splice errors often require disk reformatting and loss of all recorded data. In addition, PVRs have a higher tolerance for user-data loss than some standard computing devices, such as, for example, personal computers. PVR user-data normally comprises audio/video presentation data and loss of a few frames in general minimally affects the overall presentation.

Although EPF routines may reduce write splice errors, utilizing EPF routines will not completely prevent file system corruption. According to another aspect of the present principles, a journaling file system integrated with a cache system may be employed to both prevent data corruption and provide reading and writing efficiency. As described above, journaling filing systems are typically incompatible with cache systems. A journaling file system in accordance with an aspect of the present principles overcomes the incompatibility by distinguishing between critical data and non-critical data, which are described more fully below. Critical data may be characterized by data that tends to directly affect file system integrity if corrupted and has the potential to disable the operation of the file system. Moreover, critical data may be accessed and modified by a user and/or a system parameter and may be adjusted accordingly. Non-critical data may include data whose corruption is relatively harmless with regard to system integrity. In accordance with an aspect of the present principles, the cache is bypassed when writing critical data to the main platter. This aspect ensures that the journaled state of the system with respect to critical data is accurate, as the order in which critical data is written to the platter is consistent with the journaled writing order of a plurality of writes to the platter. Thus, when the journal is replayed upon interruption of writing operations, the file system may institute a proper recovery by referencing an accurate journal as described above, thereby preventing data corruption with respect to critical data.

With respect to writing non-critical data, according to another aspect of the present principles, a cache is utilized to provide reading and writing efficiency. The detrimental effects of any potential corruption resulting from utilization of the cache are minimal due to the relatively harmless effect of non-critical data corruption, as described more fully below. In addition, as described more fully below, non-critical data writes comprise a substantial majority of all writes to the main platter. Thus, bypassing the cache when writing critical data has a relatively nominal effect on the writing efficiency of the system as a whole. Accordingly, aspects of the present principles optimally integrate a cache system with a journaling file system to provide both robust file system integrity and an efficient reading and writing mechanism.

Figure 2:
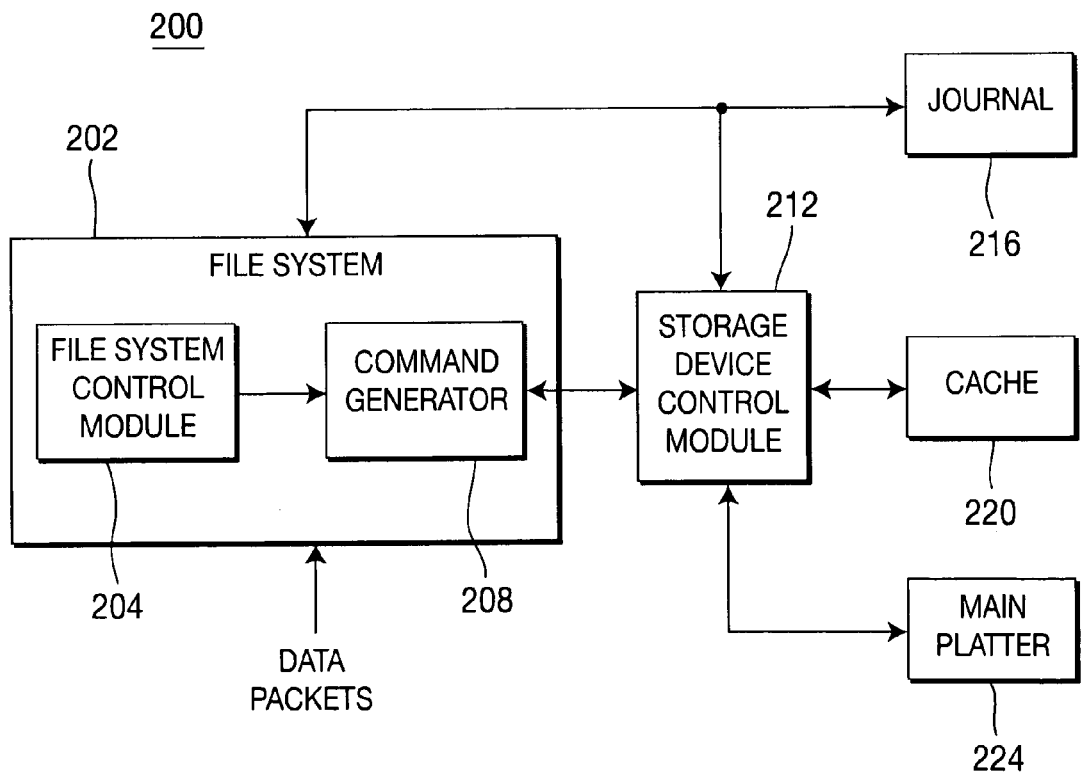
FIG. 2 is a block diagram of an exemplary implementation of a system for writing data to a storage device in accordance with aspects of the present principles.

With reference to FIG. 2, an exemplary system 200 in accordance with aspects of the present principles is presented. The system 200 includes a journaling file system 202 comprising a file system control module 204 and a command generator 208. The file system control module 204 may receive and control the organization of data within a file system 202 that is stored on a storage medium. In addition, the file system control module 204 utilizes the command generator 208 to generate commands to write data to any one of a journal 216, a cache 220 and a main platter 224. The journal 216, cache 220 and main platter 224 may be included on the same storage device or different storage devices. The system 200 also includes a storage device control module 212 that processes and executes data write commands on a storage device. The system elements of FIG. 2 introduced herein are more fully described below with reference to method implementations of aspects of the present principles.

It should be noted that the functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Integration of a journaling file system with a cache system in accordance with aspects of the present principles provides both a robust file system integrity and an efficient reading and writing mechanism. As discussed above, bypassing a cache for critical data writing in a journaling file system prevents its corruption. Corruption of critical data, such as, for example, metadata, tends to be relatively more damaging to a file system than corruption of data associated with non-critical writes. As discussed above, metadata includes information that the file system utilizes to find user-data and to perform internal maintenance; its corruption has a greater detrimental effect than corruption of user-data. The processor determines whether the data is critical or not critical, and the determination may be programmed based on the particular application of the system, for example, a video recording system. Corruption of user-data is typically limited to the portion of user-data that is corrupted, while corruption of metadata may negatively affect other portions of data in addition to the corrupted metadata. Thus, although corruption of user-data may occur as a result of utilization of a cache, its detrimental effects are minimal. Accordingly, the journaling file system in accordance with aspects of the present principles provides robust protection against file system corruption despite utilizing a cache.

Moreover, the benefits of the present principles are especially evident in PVR systems. In a PVR system, corruption of non-critical data, such as encoded, encrypted audio/video information, tends to be drastically less harmful than corruption of critical data. Damaged sectors of a storage medium including audio/visual information may only appear as a small glitch in a presentation, while corrupted metadata tends to have a greater potential for disabling the file system itself.

In addition to providing substantial protection against file system corruption, aspects of the present principles also provide efficient reading and writing capability due to utilization of a cache for non-critical data. Critical data, such as metadata, typically comprise approximately less than 10% of all data writing operations, while non-critical data, such as user-data, typically comprise approximately more than 90% of all data writing operations. Thus, bypassing the cache for critical data writes has a nominal effect on reading and writing efficiency provided by the cache, as they comprise a relatively small volume of writes. Accordingly, aspects of the present principles optimally integrate a cache system with a journaling file system to provide both a robust file system integrity and an efficient reading and writing mechanism.

Journaling filing systems that may be employed to implement aspects of the present principles described above may include, for example, XFS and EXT3FS. Beneficial features of file systems such as XFS with respect to PVR applications include its ability to provide efficient writing of multiple streams of audio-visual data. File systems such as XFS have a "real-time" partition feature in which storage space is allocated in relatively large portions to provide nearly 100% of the storage device throughput without adding complexity to the application. In contrast, desktop and timesharing file systems commonly allocate small portions of storage space of a file as it is written, resulting in sub-optimally interleaved streams with relatively poor throughput.

Additionally, a program interface specification that may be utilized to implement aspects of the present principles include ATA7. ATA7 comprises Self-Monitoring, Analysis, and Reporting Technology (SMART) features, Forced Unit Access (FUA) features, and time limited commands, each of which may particularly suit a PVR. For example, SMART features may be employed by a file system to determine the operating condition of a storage device, temperature monitoring of the storage device. Moreover, SMART features may be used to predict near future disk drive failures in hard disk drive storage devices.

FUA commands ensure that unit data is transferred to or from device media before command completion even if caching is enabled. Thus, FUA commands implement write requests that bypass, or nearly bypass, a cache. A journaling file system in accordance with aspects of the present principles may employ FUA commands to increase the likelihood of successfully writing critical data without appreciably affecting the writing of less critical data. For example, FUA commands may be utilized to implement the writing of critical data, such as file system metadata, directly to the platter in accordance with aspects of the present principles while continuing to use traditional write commands for less critical data.

Furthermore, the time limited command set included in ATA7 may be employed to institute the fixed time constraint of a PVR system. As described above, a PVR system operates under a fixed time constraint in that information is lost or discarded if the PVR does not complete a transaction within the fixed time interval. Storage mediums included in some standard computing devices, such as, for example, personal computers, conduct many time-consuming data read and write retries upon encountering an input/output or disk surface error. Utilizing such systems in PVR devices have the potential to severely disrupt a multimedia stream where an error may only be present on a single sector. The time limited commands of ATA7 may impose the fixed time constraint to abandon such retries within the time constraint. As described above, the PVR system attempts to timely display as much of a presentation as possible. Accordingly, the detrimental effect of omitting data within a sector or small group of sectors including an error is negligible and oftentimes is practically imperceptible during the display of an audio video presentation.

Features and aspects of described implementations may be applied to various applications. Applications include, for example, avoidance of data corruption on standard computing devices, personal digital assistants, MP3 players, video file players and other devices. However, the features and aspects herein described may be adapted for other application areas and, accordingly, other applications are possible and envisioned. Additionally, data may be sent and received by an apparatus in accordance with aspects of the preset principles over (and using protocols associated with) fiber optic cables, universal serial bus (USB) cables, small computer system interface (SCSI) cables, telephone lines, digital subscriber line/loop (DSL) lines, satellite connections, line-of-sight connections, and cellular connections.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data transmission and reception. Examples of equipment include video coders, video decoders, video codecs, web servers, set-top boxes, laptops, personal computers, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

The present invention is directed to storing the write counts for each track on the track or alternatively in NVRAM in the hard disk. Most hard disks already have a mechanism to remap a sector that becomes un-writable. This mechanism is used to remap entire tracks when a track write count becomes too high. A track with an excessively high write count can be mapped by the hard disk firmware to a track with a very low write count. By automatically remapping these tracks based on the write count the wear can be more evenly distributed across the platter thus increasing the service life of the hard disk without modification to the application software.

Figure 3:
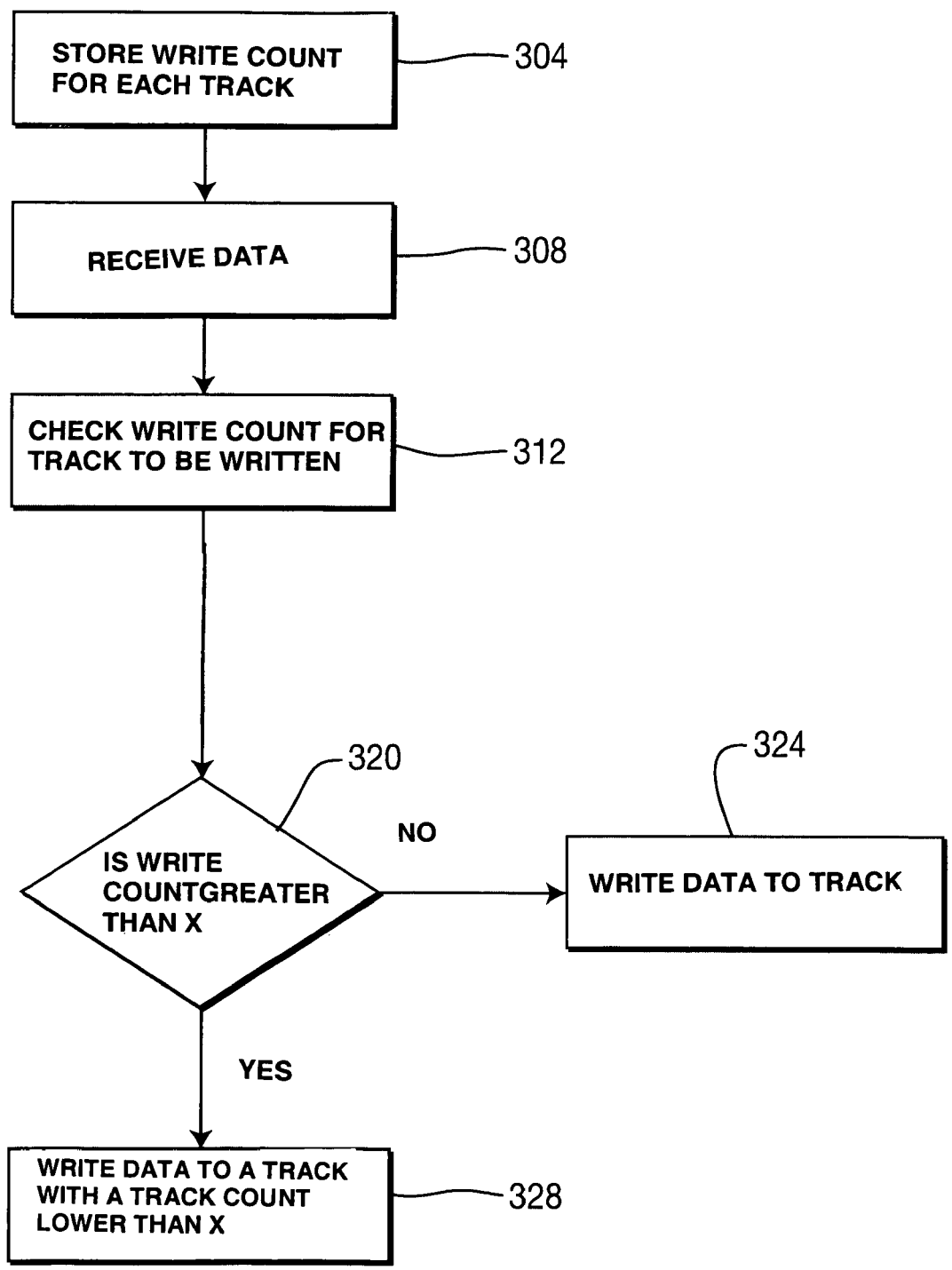
FIG. 3 is a flow diagram of an exemplary implementation of the system of FIG. 2 in accordance with aspects of the present principals.

FIG. 3 illustrates the inventive method in a step-wise manner. Initially, the write count for each track 304 of the PVR is stored either on the track or in NVRAM in the hard disk. When data to be recorded is received 308 the track count for the track to be written id checked 312. Based on the write count for the track to be written 320 the data is either written to the track 324 or automatically remapped to tracks with a low track count 328. Steps 304-320 may be repeated as data to be written is received.

Some DVR applications dedicate specific tracks for the pause buffer. As a result the number of writes to the sectors on these tracks can be much greater than the number of write cycles on other tracks. The magnetic material on these tracks can wear out at a greater rate than that of the rest of the tracks artificially reducing the overall lifespan of the drive.

It may be possible to track the number of writes to each sector/track and remap sectors at the HD controller level to address this problem and spread the writes evenly over the drive. This operation would have to be transparent to the application and take into account fragmentation and seek times without significantly impacting performance. Whole track remapping rather than individual sector remapping may help to address the fragmentation and performance issues with this type of approach.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

The invention claimed is:

1. A method for writing data to a storage device, comprising:
    determining a first write count for a first track on a storage medium;
    comparing the first write count of the first track to a predetermined track write count; and
    writing data to a second track having a second write count lower than the predetermined track write count when the first write count is greater than the predetermined track write count.

2. The method of claim 1 further comprising the steps of:
    writing the data to the first track when the first write count is less than the predetermined track write count.

3. The method of claim 1, wherein the first write count is stored on the first track.

4. The method of claim 1, wherein the first write count is stored in the storage device.

5. The method of claim 4, wherein the storage device is a hard disk.

6. The method of claim 5, the first write count is stored in a non-volatile random access memory NVRAM in the hard disk.

7. The method of claim 1, wherein a plurality of write counts for a plurality of tracks are determined.

8. The method of claim 7, wherein a first write count of one of the plurality of write counts is compared to the predetermined track write count; and
    writing data to a second track of the plurality of tracks having a second write count lower than the predetermined write count when the first write count is greater than the predetermined write count.

* * * * *